US006519508B1

(12) United States Patent
Saito

(10) Patent No.: US 6,519,508 B1
(45) Date of Patent: Feb. 11, 2003

(54) VALVE POSITIONER AND CURRENT-TO-PNEUMATIC CONVERTER

(75) Inventor: Yoji Saito, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 09/540,248

(22) Filed: Mar. 31, 2000

(30) Foreign Application Priority Data

Apr. 19, 1999 (JP) .......................................... 11-110779

(51) Int. Cl.[7] ............................................... G05D 11/00
(52) U.S. Cl. ................ 700/282; 137/487.5; 251/129.04
(58) Field of Search ................................ 700/282, 275; 137/486–487, 82, 84–86; 251/129.04, 129.01

(56) References Cited

U.S. PATENT DOCUMENTS

| | | | | | |
|---|---|---|---|---|---|
| 4,573,114 | A | * | 2/1986 | Ferguson et al. | 700/9 |
| 5,172,311 | A | * | 12/1992 | Reinhart et al. | 700/11 |
| 5,431,182 | A | * | 7/1995 | Brown | 137/85 |
| 5,654,885 | A | * | 8/1997 | Mayhew et al. | 700/282 |
| 5,927,327 | A | * | 7/1999 | Bezos et al. | 137/624.11 |
| 5,931,180 | A | * | 8/1999 | Nagasaka | 137/85 |
| 6,186,167 | B1 | * | 2/2001 | Grumstrup et al. | 137/14 |
| 6,283,138 | B1 | * | 9/2001 | Friend et al. | 702/138 |
| 6,453,261 | B2 | * | 9/2002 | Boger et al. | 702/138 |

* cited by examiner

*Primary Examiner*—Leo Picard
*Assistant Examiner*—Zoila Cabrera
(74) *Attorney, Agent, or Firm*—Moonray Kojima

(57) ABSTRACT

A valve positioner and current-to-pneumatic converter having a reduced number of components and increased current allocation to a current-to-pneumatic conversion module therein, wherein current signals containing set point information are applied to a digital computation circuit through input terminals which carries out control computation to control valve openings so that each valve opening agrees with each corresponding set point; and a current-to-pneumatic conversion module converts the control outputs from the digital computation circuit into pneumatic signals; and further comprising a power voltage generator that generates an internal power voltage from the current signal; a variable impedance circuit connected in series to the power voltage generator and in parallel to the current-to-pneumatic conversion module; and an impedance control circuit that controls the impedance of the variable impedance circuit.

12 Claims, 9 Drawing Sheets

VALVE POSITIONER AND CURRENT-TO-PNEUMATIC CONVERTER

BACKGROUND OF THE INVENTION

1. Field of Invention

This invention relates to a valve positioner using digital communication; and more particularly, to an improvement thereof, wherein the current to be allocated to a current-to-pneumatic conversion module can be increased; and wherein, the invention can be applied to convert electrical signals to pneumatic signals.

2. Description of the Prior Art

A valve positioner directly controls the opening of a valve and its feedback signal uses a valve opening signal or a stem position signal. A current-to-pneumatic converter converts an electrical signal, such as, for example, 4 to 20 mA, into a pneumatic signal such as 0.2 to 1.0 [kgf/cm$^2$]. An example of a prior valve positioner is disclosed in Japan Unexamined application 9/144,703.

FIG. 1 shows a conventional valve positioner 100, wherein an operating signal for valve positioner 100, using an electrical signal, such as for example, 4 to 20 mA, is inputted to terminals T1 and T2. Variable impedance circuit 3 and shunt regulator 4, connected in series, are connected to input terminals T1 and T2. Internal power voltage V2, which drives the internal circuits of the valve positioner 100, is generated on/the positive side of shunt regulator 4. The shunt regulator 4 may comprise one or more Zener diodes, integrated circuits, or combinations thereof with their peripheral elements.

Impedance control circuit 1 is connected to input terminals T1 and T2 and operates to adjust the impedance of variable impedance circuit 3 to control the voltage between input terminals T1 and T2 normally to an approximately constant voltage of 12V or less. The operation maintains the impedance between input terminals T1 and T2 in a low state in the DC region of the operating signal. The variable impedance circuit 3 may comprise npn transistors, pnp transistors, or field effect transistors (FET).

DC—DC converter 5, connected in parallel to shunt regulator 4, is used to increase the current capacity by stepping down internal power voltage V2 supplied by shunt regulator 4. Thus, DC—DC converter 5 supplies operating voltage V3 to current-to-pneumatic conversion module (called "E/P module") 14 which consumes high power and micro-controller 9. Since the valve positioner 100 must be operated so that its minimum operating current is 4 mA at most and normally is 3.6 mA or less because of the limitation of the input signal current, the desired current capacity is achieved by using DC—DC converter 5. The DC—DC converter 5 may comprise a voltage stepping down DC—DC converter, such as a charge pump type or a switching regulator type.

Current detecting or sensing element 2 and current detector 7 detect a current signal inputted to input terminals T1 and T2 and the detected signal is set to A/D converter (ADC) 8. The current detecting element 2 is a resistor and the current detector 7 is an amplifier using an operational amplifier.

Transmit-and-receive circuits 6 receive a request signal, sent from a corresponding instrument (not shown) and transmit a response signal to the corresponding instrument via digital communication. In this case, the corresponding instrument is connected to input terminals T1 and T2 via a two wire transmission line.

Micro-controller 9, which carries out digital communication with and position control to valve 16, comprises a microprocessor and peripheral circuits, such as a memory, and stores communication processing programs, such as request signals, and response signals, and control programs, such as PID control and fuzzy control. Digital to analog converter (DAC) 10 converts a digital control output signal of the micro-controller 9 to an analog signal. Driver 13 carries out amplification and impedance conversion of the analog signal, sent from DAC 10, and transmits the resulting signal to E/P module 14. Sensor interface 11 processes the signal from the position sensor 12 and sends the resulting signal to analog to digital converter (ADC) 8. ADC 8 digitizes the input current signal, sent from current detector 7, and the position signal, from valve 16, and transmits the digitized results to micro-controller 9.

The pneumatic system operates as follows. E/P module 14 converts the input drive current to a corresponding pneumatic signal and, for example, controls the air pressure of a nozzle using a torque motor. Control relay 15 amplifies the pneumatic signal and thus, for example, drives valve 16 to be in an open or closed state using the pneumatic signal of 0.2 to 1.0 [kgf/cm$^2$]. Since the opening of valve 16 is correlated to changes of its stem position, the stem position is detected by position sensor 12.

In the FIG. 1 system, digital communication is provided between the corresponding instrument and the valve positioner by superimposing digital signals according to a predetermined protocol on a two wire transmission line that sends and receives operating signals, such as of 4 to 20 mA value. In addition, for implementing digital communication with the corresponding instrument, it is necessary to keep the impedance between the input terminals T1 and T2 at a definite high value in a communication frequency band in order to generate digital communication signals sent from the corresponding instrument between terminals T1 and T2. Accordingly, impedance control circuit 1 controls the impedance of variable impedance circuit 3 to high values of, for example, 230 ohms to 1100 ohms in the communication band.

Valve position control is provided as follows. A position signal of position sensor 12 is sent to micro-controller 9 via sensor interface 11 and ADC8, is subjected to control computation in micro-controller 9 and a resulting control output signal is sent to drive circuit 13 via DAC 10. Valve opening is controlled to a target value by driving valve 16 via the signal route of drive circuit 13→E/P module 14→control relay 15→valve 16.

Typical operating specifications are as follows. Minimum operating voltage between terminals: 12 V DC (between input terminals T1 and T2). Minimum operating current: 3.6 mA. That is, the digital communication function and valve position control must function within the range of 4 mA supplied to the input terminals T1 and T2. On the other hand, in the case of using a microprocessor for the micro-controller 9, even though power consumption of electronic devices is decreasing due to energy saving techniques, the current consumption for E/P modules 14 is still limited in efficiency as compared with circuits that do not use a microprocessor. However, since most E/P modules 14 are current operated devices, a problem exists in the prior art in that decreasing the current allocation to the E/P module worsens the valve response or eliminates the stability margin due to disturbances such as due to temperature.

In the microprocessor itself, the control cycle for control computation must be shortened by increasing the clock frequency to obtain stability in valve control. However, disadvantageously, another problem arises, in that current consumption in the microprocessor itself increases when the clock frequency is increased.

Hence, in order to effectively utilize the power provided to a valve positioner as an operating signal, a technique has been tried to achieve a supply current to internal circuits, including E/P modules 14, using DC—DC converters 5, which step down the power voltage, such as shown in FIG. 1. To realize such DC—DC converter 5, a charge pump type, using a capacitor or voltage stepping down switching regulator using an inductance, has been considered. However, such methods all have a further problem in that the manufacturing cost thereof increases because of the necessity to increase mounting surfaces and/or the number of components. Furthermore, disadvantageously, if the voltage stepping down switching regulator is used, adverse effects on other circuits due to switching noise, cause other problems.

U.S. Pat. No. 5,431,182 suggests another technique for effectively utilizing as an operating signal power provided to a valve positioner. This method connects two power circuits in series between the input terminals and uses one power circuit for supplying power to the digital circuits and the other power circuit for supplying power to other circuits. However, a level shift circuit to absorb differences between the two power systems is required to exchange signals between the circuits connected to the two power circuits. Thus, this prior method also has a problem in that the circuits are more complex.

The foregoing problems are also applicable to current-to-pneumatic converters.

Accordingly, as can be appreciated, the prior art needs improvement.

SUMMARY OF THE INVENTION

An object of the invention is to overcome the aforementioned and other deficiencies, problems, and disadvantages of the prior art.

Another object is to provide a valve positioner and current-to-pneumatic converter which has a reduced number of parts or components and which is simple, and wherein current allocation to the E/P module is increased.

DETAILED DESCRIPTION OF THE PREFERRED EMBODIMENTS

Figure 1:
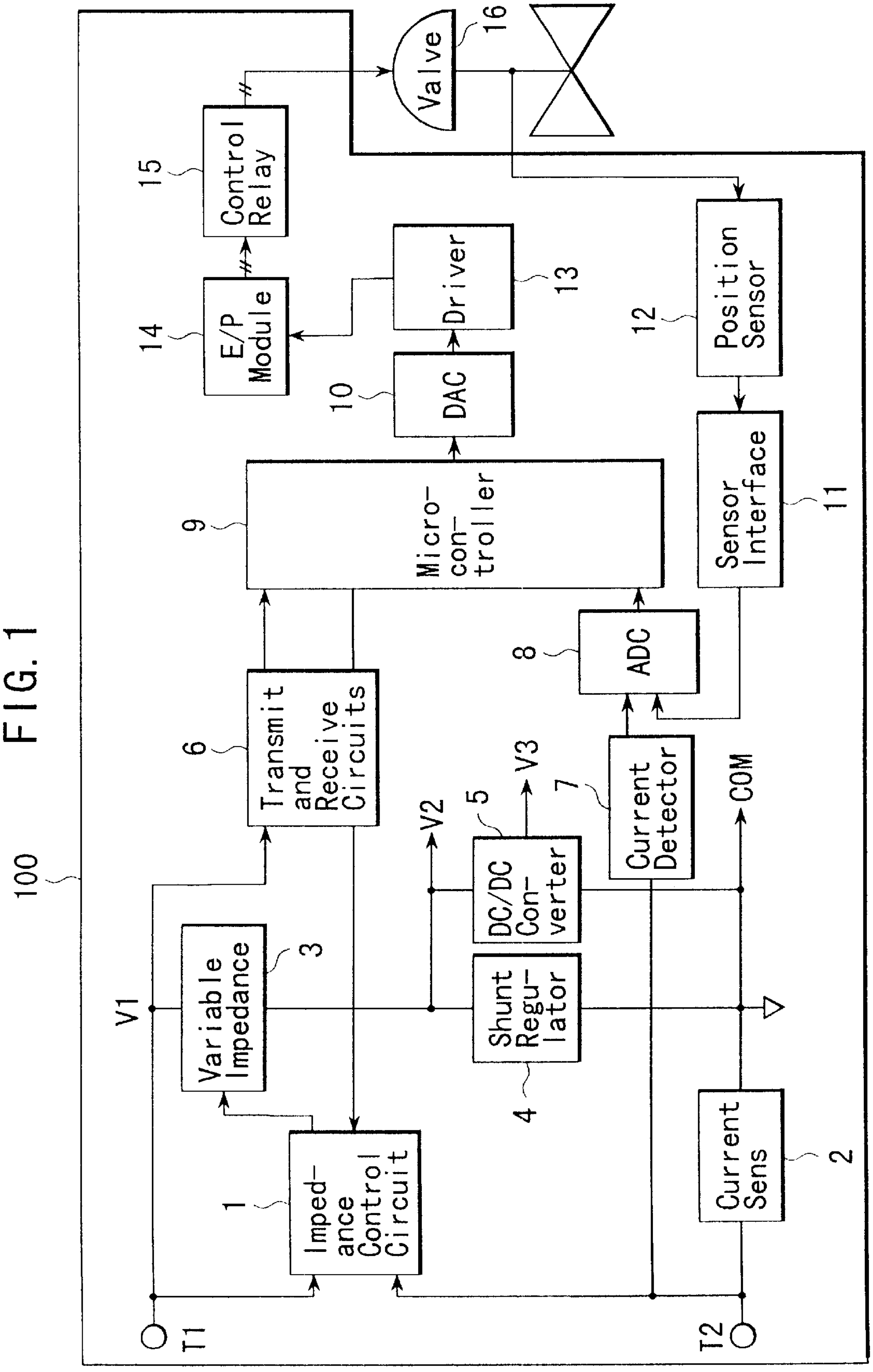
FIG. 1 is a diagram depicting a conventional valve positioner.
Figure 2:
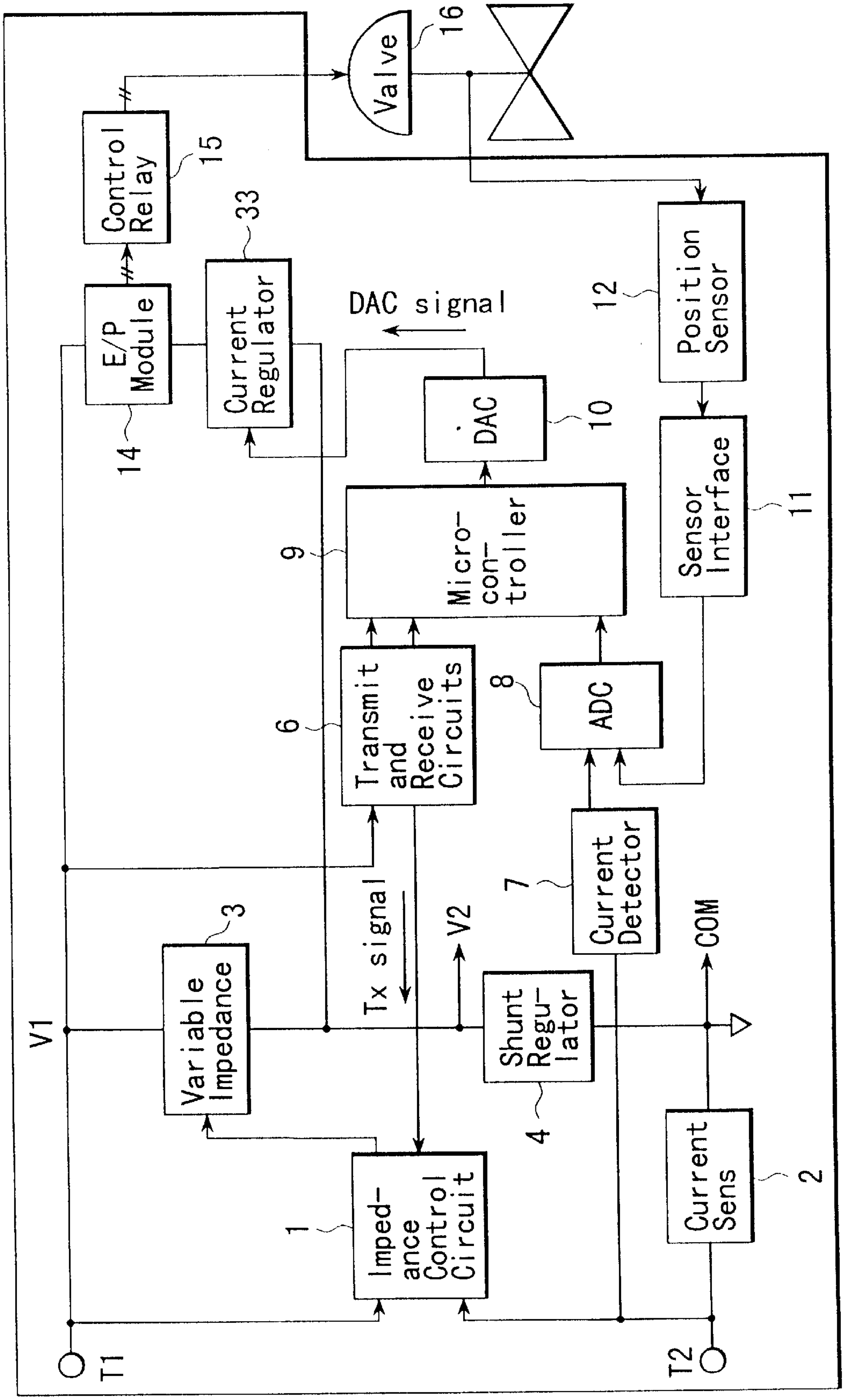
FIG. 2 is a diagram depicting an illustrative embodiment of a valve positioner of the invention.

FIG. 2 shows an illustrative embodiment wherein the same symbols identify the same or similar parts as those shown in FIG. 1, and description thereof is omitted hereat for sake of clarity of description. In FIG. 2, variable impedance circuit 3 and shunt regulator 4 are connected in series between input terminals T1 and T2. Impedance control circuit 1 controls the voltage between input terminals T1 and T2 to an approximate constant voltage, normally of 12 V or less, and maintains the impedance between input terminals T1 and T2 in a low impedance state in the DC region of operating signals, and maintains that impedance at a definite high value in the communication frequency band. Shunt regulator 4 generates internal power voltage V2 that drives the internal circuit components.

Figure 3:
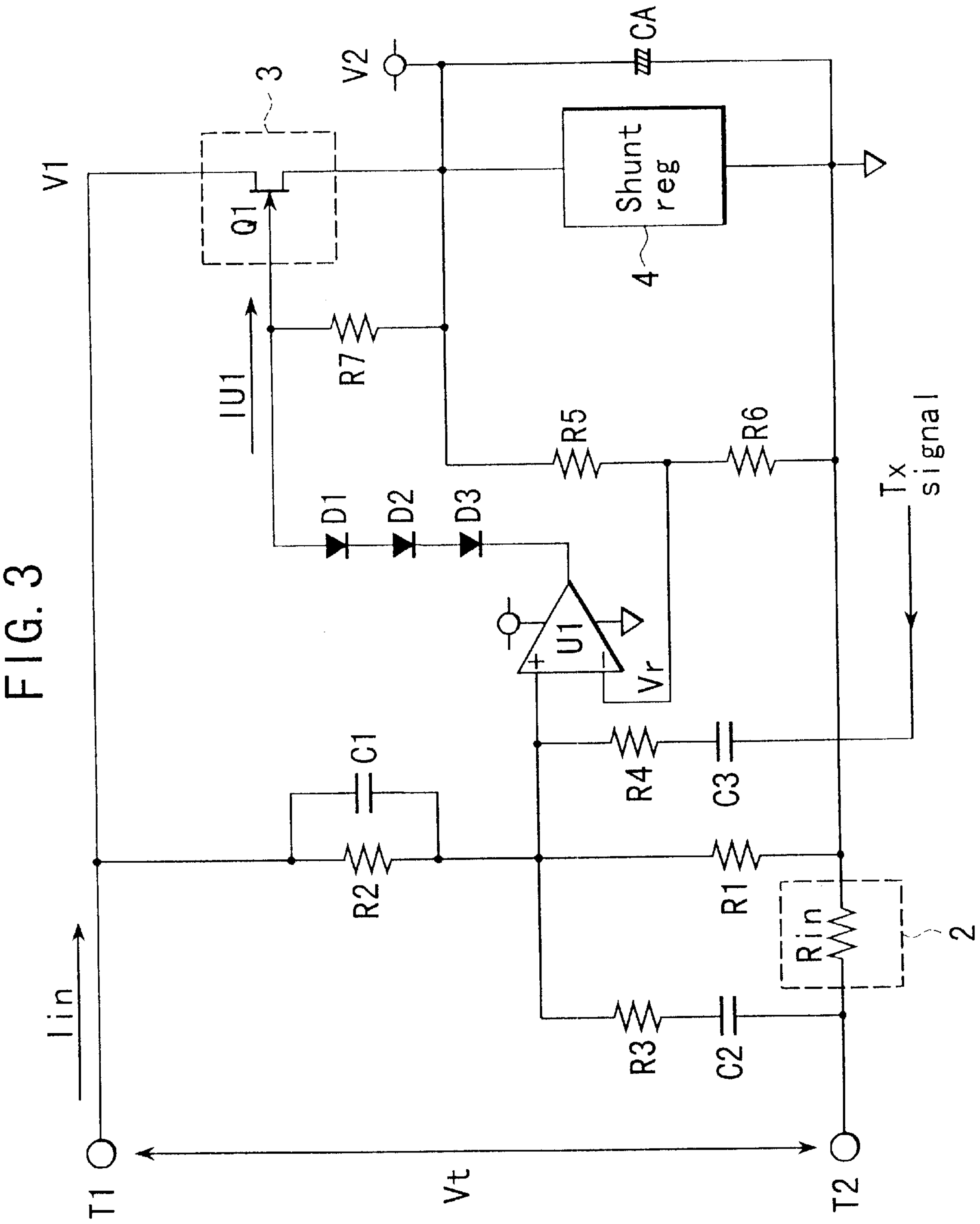
FIG. 3 is a circuit diagram depicting details of a portion of the embodiment of FIG. 2

FIG. 3 shows details of variable impedance circuit 3, shunt regulator 4 and impedance control circuit 1. Input terminal T1 is connected (a) to the positive terminal of differential amplifier U1 through a parallel circuit comprising resistor R2 and capacitor C1; and (b) to the drain terminal of n-channel junction FET (called JFET) Q1, which serves as the variable impedance circuit 3. Input terminal T2 is connected (a) to the positive terminal of differential amplifier U1 through a series circuit comprising capacitor C2 and resistor R3 and (b) to one end of resistor Rin which serves as the current detecting element 2. The other end of resistor Rin is connected (a) to the positive terminal of differential amplifier U1 through resistor R1 and (b) to the circuit common potential. The source terminal of JFET Q1 is connected to one end of shunt regulator 4, whose other end is connected to the circuit common potential. The gate terminal of JFET Q1 is connected to the output terminal of differential amplifier U1 through level shift diodes D1, D2, and D3. Both ends of the series connected resistors R5 and R6 are connected in parallel with shunt regulator 4, and the interconnection point between resistors R5 and R6 is connected to the negative terminal of differential amplifier U1. In addition, the gate terminal and source terminal of JFET Q1 are connected to diode bias resistor R7. Capacitor CA is connected in parallel with shunt regulator 4. The output signal Tx signal, from transmit-and-receive circuit 6 (of FIG. 2) is supplied to the positive terminal of differential amplifier U1 through capacitor C3 and resistor R4 connected in series. Thus, in FIG. 3, the portion, except for JFET Q1, used as the variable impedance circuit 3, resistor Rin used as the current detecting element 2, and shunt regulator 4, may represent impendance control circuit 1 in FIG. 2.

The voltage Vt between input terminals T1 and T2 in the DC region in the foregoing embodiment is represented as follows:

$$Vt = V1 + Iin \times Rin = (1 + R2/R1) \times Vr + Iin \times Rin$$

wherein Iin is the current flowing in from the input terminal T1; Vr is the voltage applied to the negative terminal of differential amplifier U1; and V1 is the voltage generated by variable impedance circuit 3; and the impedance between terminals T1 and t2 is low in this region.

In addition, the impedance |Z| between input terminals T1 and T2 and the frequency band flz to fhz in the digital communication band in the foregoing embodiment are represented as follows;

$$|Z| = R2/R3 \times Rin$$

$$flz = 1/(2\pi \times R3 \times C2)$$

$$fhz = 1/(2\pi \times R2 \times C1)$$

and wherein the impedance is high in this region. Also, the differential amplifier U1 may comprise an amplifier having sufficient frequency band to implement the foregoing control.

In this case, the transmission amplitude Tx and the frequency band fltx to fhtx of the communication signals sent to the corresponding instrument are as follows:

$$Tx = R2/r4 \times (Tx \text{ signal})$$

$$fltx = 1/(2\pi \times R4 \times C3)$$

$$fhtx = 1/(2\pi \times R2 \times C1)$$

In addition, in the output Tx signal from transmit-and-receive circuits 6, harmonics may be removed in advance using a first order lag circuit, or the like, so that unnecessary harmonics are not transmitted.

In the FIG. 2 embodiment, both ends of the series connected current regulator 33 and E/P module 14, are connected in parallel with variable impedance circuit 3. Current regulator 33 converts an analog signal outputted from DAC 10 to a current signal and supplies the converted signal to E/P module 14.

Figure 4:
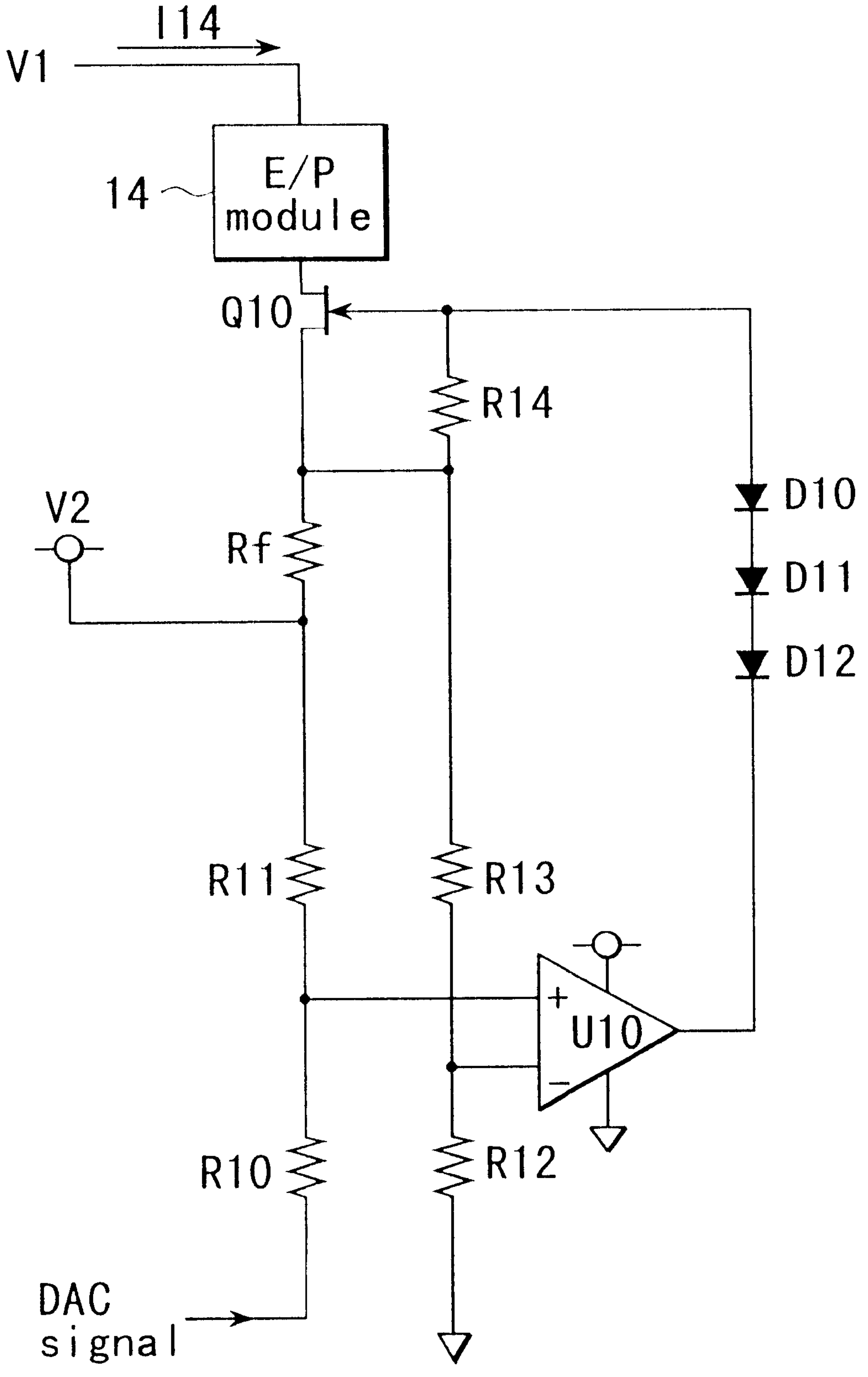
FIG. 4 is a diagram depicting details of a current regulator of the invention.

FIG. 4 shows details of current regulator 33 wherein a JFET Q10 is used for a current variable element. The drain terminal JFET Q10 is connected to E/P module 14 and the source terminal thereof is connected to internal power voltage V2 through resistor Rf. Voltage dividing resistors R10 and R11 divide the differential voltage between internal power voltage V2 and analog signal outputted from DAC 10, DAC signal. The divided voltage is inputted to the positive terminal of differential amplifier U10. Voltage dividing resistors R13 and R12 divide the differential voltage between the source voltage of JFET Q10 and the circuit common potential. The divided voltage is inputted to the negative terminal of differential amplifier U10. Differential amplifier U10 sends a control signal to the gate terminal of JFET A10 through level shift diodes D10, D11, and D12 and determines current I14 supplied to the E/P module 14 by operating JFET Q10 as a variable resistor. Resistor R14, connected between the gate terminal and source terminal of JFET A10 and level shift diodes D10, D11 and D12 are components for driving the gate terminal of JFET Q10. Resistor Rf detects current I14 supplied to E/P module 14. The supply current I14 flowing into E/P module 14 is represented as follows, when the relations R11=R13, and R10=R12, hold:

$$I14 = DAC \text{ signal} \times (R11/R10)/Rf$$

The embodiment of FIG. 4 functions to provide control of the position of valve 16 by micro-controller 9 according to operating signals inputted from input terminals T1 and T2. During the control function, supply current I14 flowing in E/P module 14 varies dynamically. However, if the current flowing in the variable impedance circuit 3 is represented as 13, since impedance control circuit 1 adjusts the variable impedance circuit so that the following equation holds $$I3 = Iin - I14$$

to control the voltage between the input terminals T1 and T2 to a constant voltage, E/P module 14 and variable impedance circuit 3 are connected in parallel.

In other words, the current required from the E/P module 14 can be preferentially allocated to E/P module 14 by making the E/P module 14 of high power consumption and providing variable impedance circuit 3 in parallel.

Figure 5:
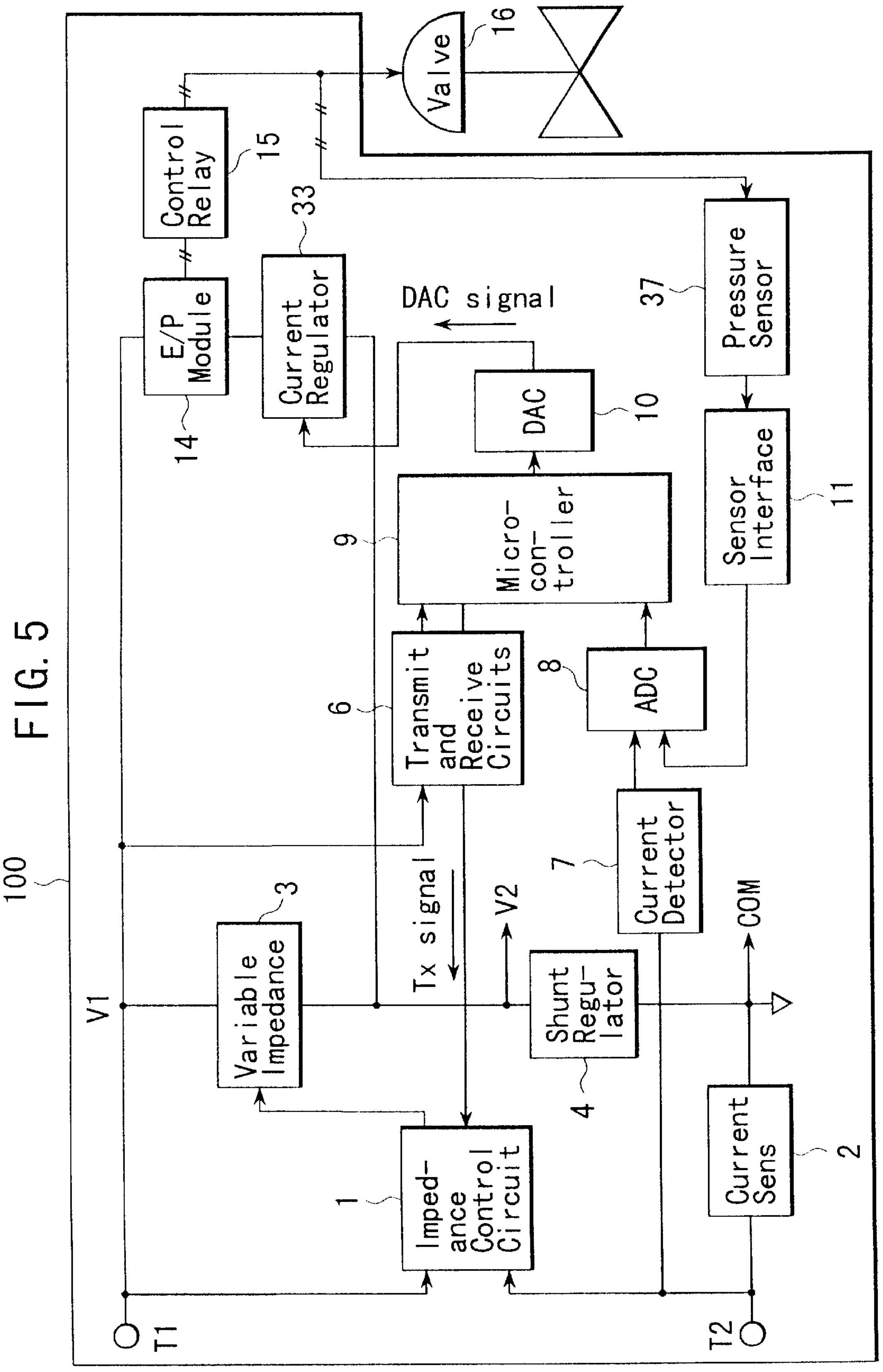
FIG. 5 is a diagram depicting another illustrative embodiment of the invention as applied to a current-to-pneumatic converter.

FIG. 5 shows another illustrative embodiment as applied to a current-to-pneumatic converter. FIG. 5 differs from FIG. 2 in that pressure sensor 37 is provided instead of position sensor 12. Pressure sensor 37 receives a pneumatic signal outputted from control relay 15 as an input signal. The embodiment can be directly applied to a current-to-pneumatic converter because the controlled system comprises an input air pressure applied to valve 16. In this case, the same effect as obtained in valve positioners can be obtained in current-to-pneumatic converters.

Furthermore, the invention can be applied to valve positioners whose main objective is valve position control and to valve positioners having a process controller function, such as disclosed in U.S. Pat. No. 5,684,451 and 5,451,923.

Figure 6:
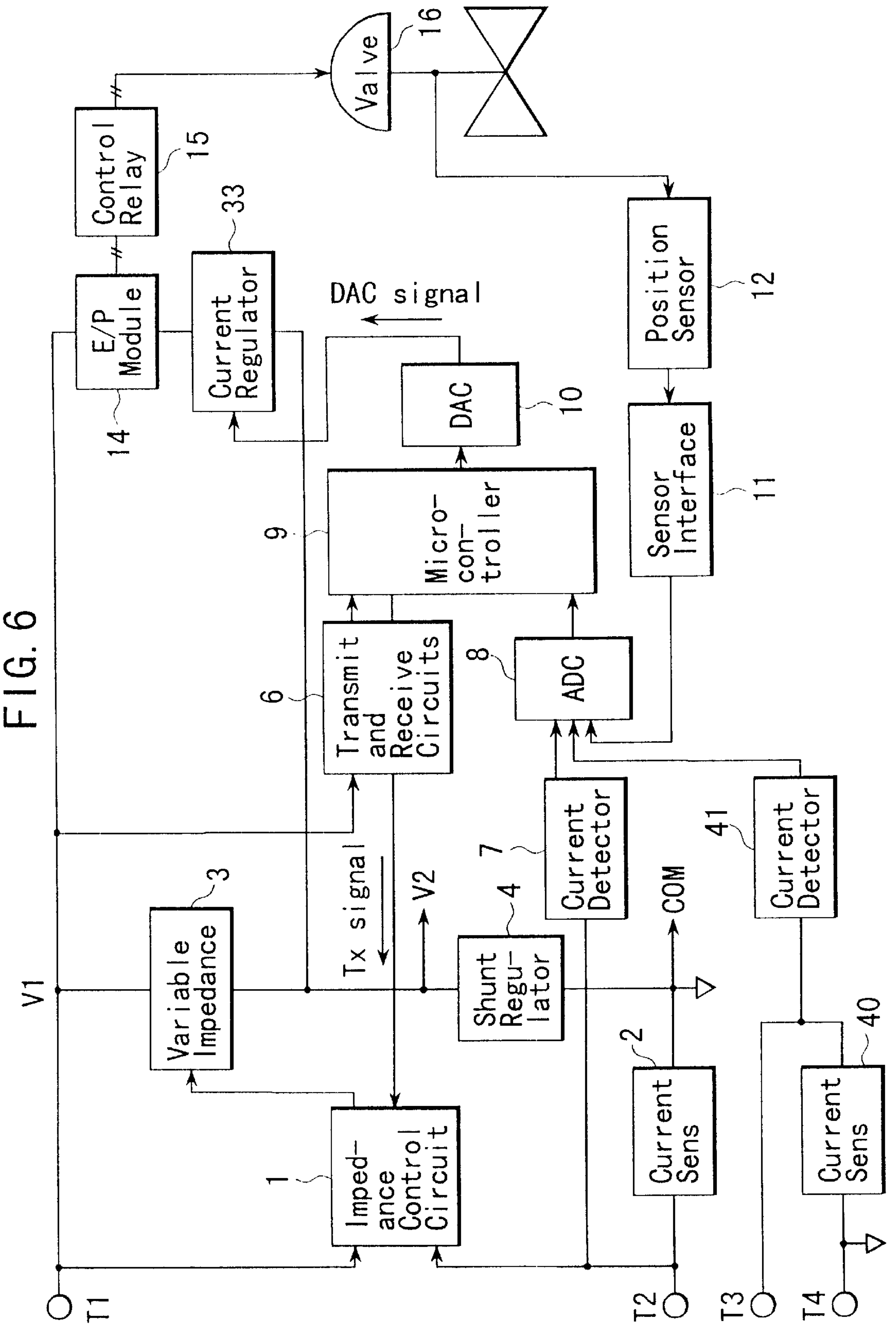
FIG. 6 is a diagram depicting a further illustrative embodiment of the invention further utilizing a processor controller function.

FIG. 6 shows a further illustrative embodiment as applied to a valve position using a process controller function. FIG. 6 differs from FIG. 2 in that micro-controller 9 is provided with computation programs for process controllers and the positioner is additionally provided with process input terminals T3 and T4, current detecting element 40, and current detector 41. A process signal inputted from process input terminals T3 and T4 is detected with current detecting or sensing element 40 and current detector or sensor 41 as a current signal. The current signal is acquired by micro-controller 9 and processed according to the computation program therein for process control, through ADC 8. Fluid flow passing through a flowmeter can be maintained at a set point value inputted to input terminals T1 and T2 using valve 16 by carrying out the following steps:

(1) Inputting the set point signal, to be given to a process controller, to input terminals T1 and t2.

(2) Inputting the process signal, for example of 4 to 20 mA in value, outputted from the flowmeter, to input terminals T3 and T4.

In addition, the effect obtained with the embodiment can also be applied to current-to-pneumatic converters with a process controller.

Figure 7:
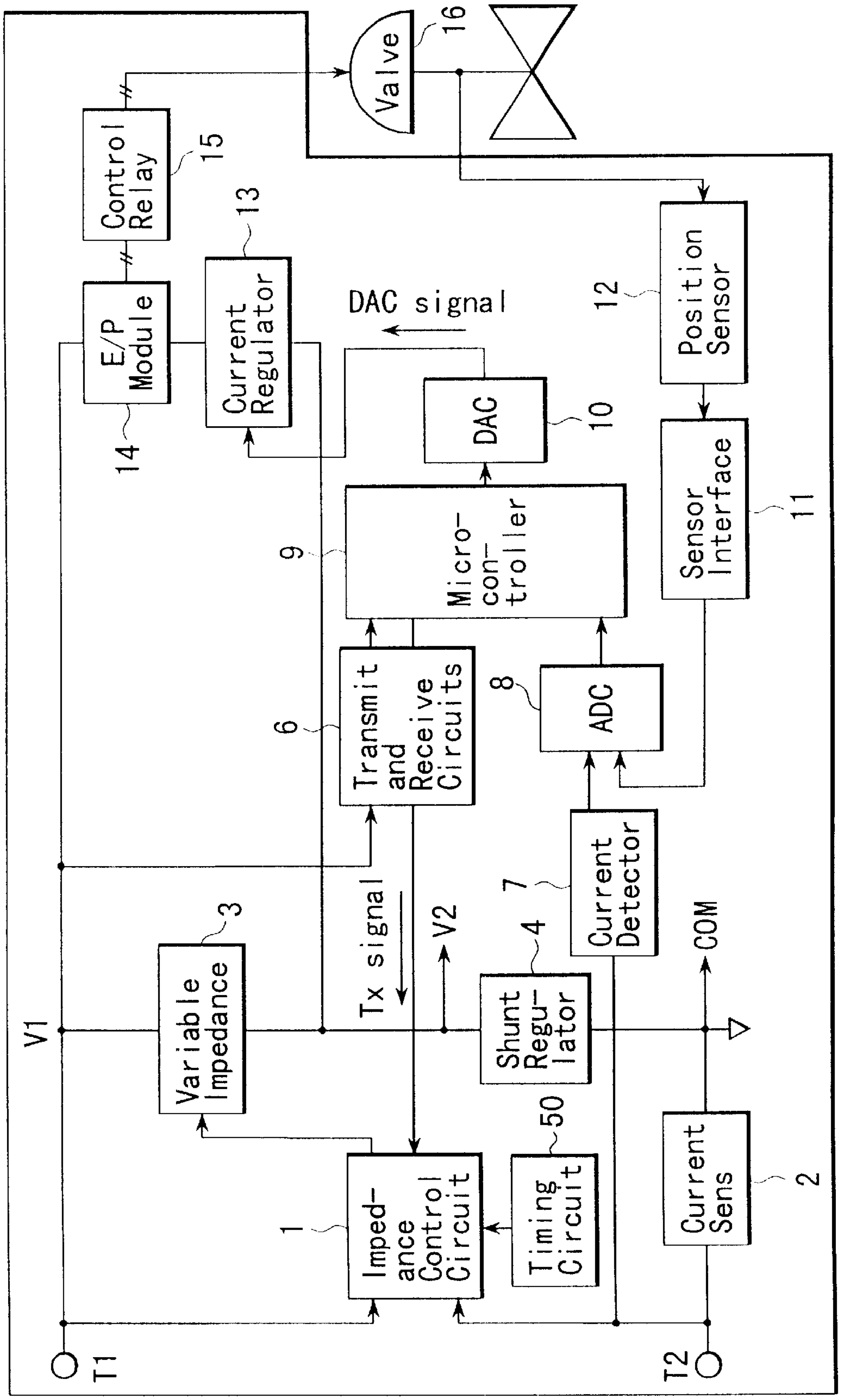
FIG. 7 is a diagram depicting another illustrative embodiment of the invention utilizing a timing circuit.

FIG. 7 shows another illustrative embodiment wherein the start up characteristics are improved in a valve positioner of the invention by adding a timing circuit 50 to the impedance control circuit 1. The valve positioner of the invention controls valve 16 by inputting to input terminals T1 and T2 an operating signal outputted from, for example, a centralized monitoring system or a distributed control system (known as "DCS") utilizing computer systems. In DCSs in general, the control signal outputted from the DCS itself is always monitored. If the voltage, between terminals for the operating signal current outputted from the DCS itself, for example, exceeds a certain definite value, the DCS may decide that the phenomenon is a disconnection of the signal line sending the operating signal and hence may issue a disconnect alarm.

In the embodiment of FIG. 2, if a control signal inputted to input terminal T1 from a DCS rises stepwisely from zero, a control output signal IU1, form impedance control circuit 1, may be cut off transiently at the moment when the internal circuit starts up. Thus, the voltage between input terminals T1 and T2 may greatly exceed the steady state value. In that case, the DCS may provide a disconnect alarm.

Figure 8:
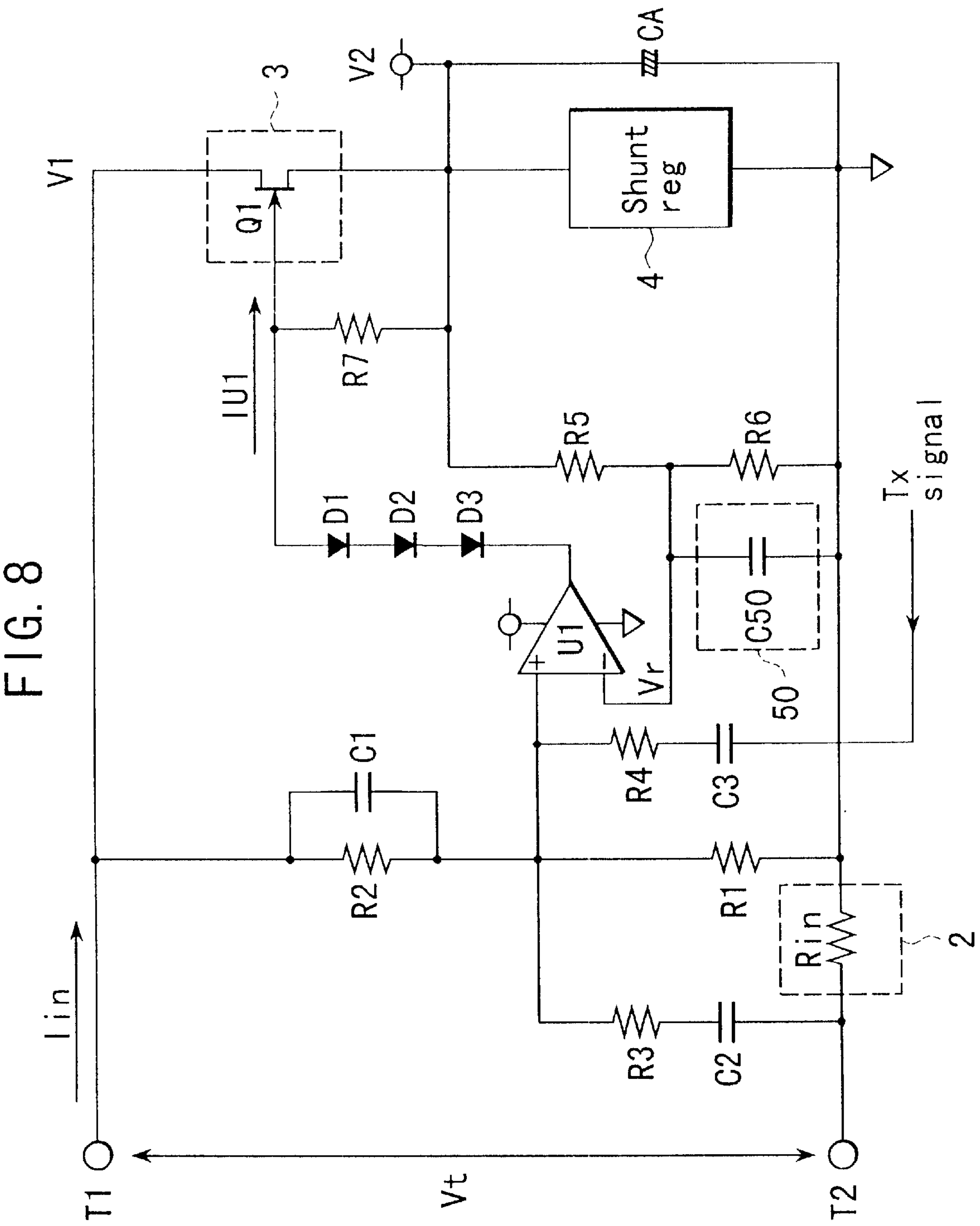
FIG. 8 is a diagram depicting details of the timing circuit of the embodiment of FIG. 7.

The timing circuit 50 is a circuit added to avoid the foregoing false disconnect alarm. FIG. 8 shows an example of a timing circuit 50 which is added to a variable impedance circuit 3, shunt regulator 4 and impedance control circuit 1, such as described in FIG. 3. The embodiment of FIG. 8 differs from that of FIG. 3 as follows: A capacitor C50 is added in parallel to resistor R6 to form the delay circuit 50, which is connected to the negative terminal of amplifier U1 and to the circuit common potential. In the embodiment, the output from the differential amplifier U1 is deflected beyond the limit on the positive power side at the moment when the circuit is started.

Figure 9:
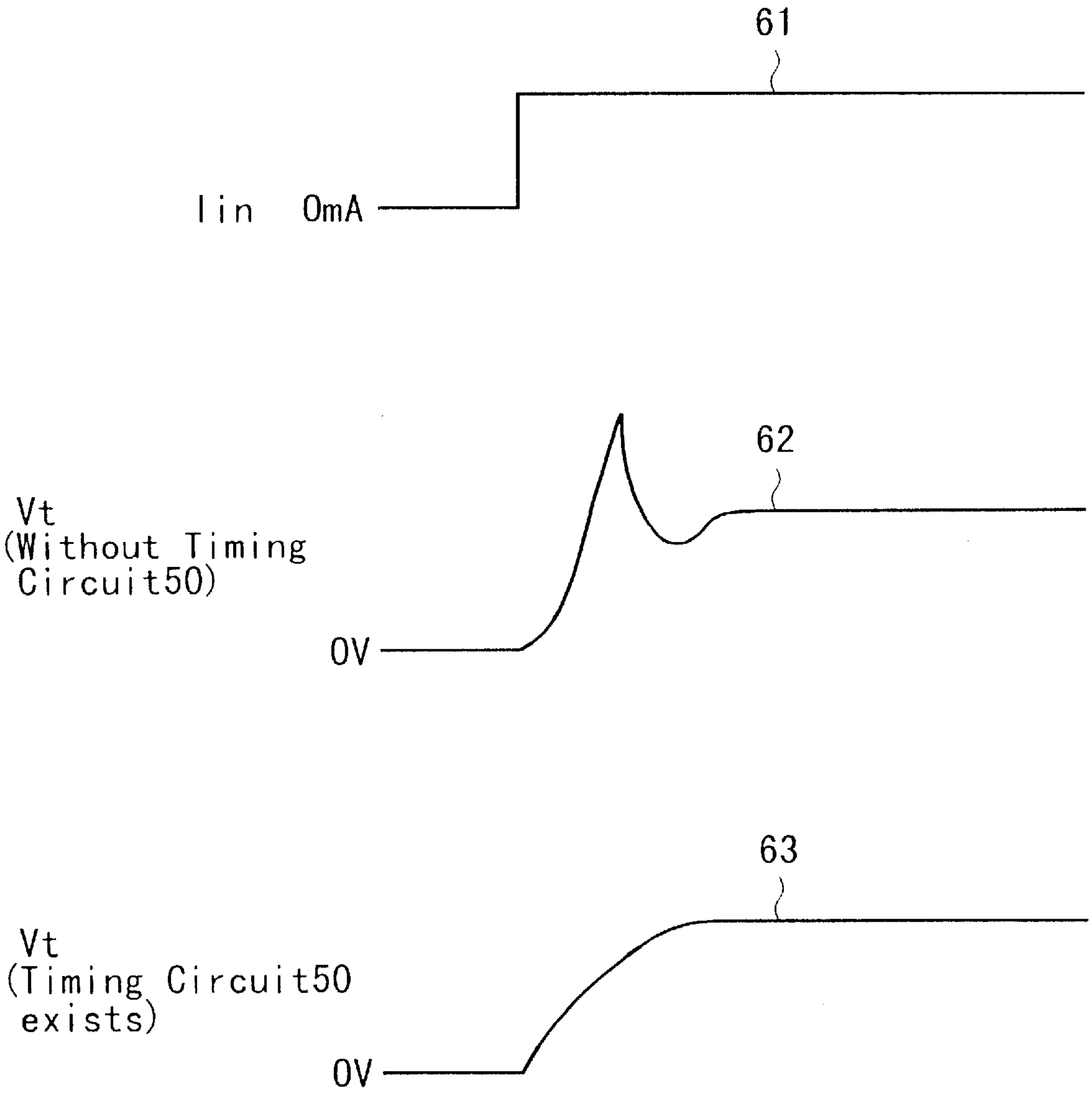
FIG. 9 is a waveform diagram depicting operation of the timing circuit of FIG. 8.

FIG. 9 is a waveform diagram of voltage between the input terminals T1 and T2, wherein waveform 61 is the operating signal Iin that is inputted stepwisely; waveform 62 is the voltage between the terminals T1 and T2 without using timing circuit 50; and waveform 63 is the voltage between the terminals T1 and T2 using the timing circuit 50. As can be appreciated from FIG. 9, by adding the timing circuit 50 to the valve positioner of FIG. 8, smooth start up of the valve positioner is attained, even when the operating signal is inputted stepwisely. Also, advantageously, the effect obtained with the embodiment can be applied to current-to-pneumatic converters and such system also using process controller functions.

The foregoing description shows specific preferred embodiments of the invention for explaining and indicating examples thereof. Hence, it is to be understood that the invention is not restricted to the foregoing embodiments, but covers various extensions, changes and modifications in the scope without departing from the spirit of the invention.

The invention can be applied to all systems that are provided with current-to-pneumatic conversion elements that use a current as the input signal from the outside and use that signal as the power source for the internal circuits thereof.

Moreover, variable impedance circuit 3 in FIG. 3 is not restricted to an n-channel junction FET, but, can be replaced with devices that can change the current value, such as npn transistors, pnp transistors, MOS-FETs, or electronic circuits which combine these devices. This situation is the same for the n-channel junction FET Q10 in FIG. 4.

In FIG. 2, although variable impedance circuit 3, shunt regulator 4 and current detecting element 2 are connected between input terminals T1 and T2 in the foregoing order from terminal T1 toward terminal t2, the order of connection can be changed. That is, the objectives of the invention can be achieved when almost all the current values inputted from input terminals T1 can be detected by current detecting element 2 and variable impedance circuit 3 is connected in parallel with E/P module 14.

Moreover, the internal power voltage V2 used to drive the internal circuits is generated only by shunt regulator 4 in FIG. 2. However, it is also possible to achieve a higher current capacity by using a DC—DC converter from the internal power voltage V2. This achieves a higher supply current to be applied to the internal circuits.

Also, although E/P module 14 is described as converting the input current into pneumatic signal, E/P modules that utilize other principles, for example, the use of piezoelectric elements which generate a force from a voltage, may be used. In this case, a voltage signal, not a current signal, would be inputted to the E/P module in FIG. 2 from DAC 10 and current regulator 33 becomes unnecessary.

Moreover, a variable impedance circuit 3 and E/P module 14 connected in parallel may be used within the scope of the invention.

The invention provides the following effects and advantages:

In the embodiment of FIG. 2, it is possible to provide a valve positioner wherein the number of components is reduced and the systems is simple, and furthermore, allocation of current is increased to the E/P module which has high current consumption. Furthermore, the embodiment implements digital communications with a corresponding instrument. In addition, the current necessary for an E/P module of high current consumption is supplied by changing the current allocation in the internal components without using a DC—DC converter that steps down the power voltage or without using a specific power circuit. Thus, current utilization efficiency is good, and a large amount of current allocated to the micro-controller.

In the embodiment of FIG. 5, it is possible to provide a current-to-pneumatic converter wherein the number of components is fewer and the circuit configuration is simple while at the same time increasing current allocation to the E/P module which is of high current consumption characteristics. Also, the embodiment can implement digital communication with a corresponding instrument. In addition, the current required from the E/P module is supplied by changing the current allocation to the internal circuits without using a DC—DC converter or a specific power circuit. Accordingly, -the current efficiency is improved and also, a large amount of current can also be supplied to the micro-controller.

What is claimed is:

1. A valve positioner comprising:

digital computation means for receiving current signals containing set point information as inputs through input terminals, and for controlling valve openings so that each opening agrees with each corresponding set point value;

current-to-pneumatic conversion means for converting control signals from said digital computation means into pneumatic signals;

power voltage generating means for generating an internal power voltage from said current signals;

a variable impedance circuit connected in series with said power voltage generating means;

impedance control means for controlling impedance of said variable impedance circuit; and means for parallelly connecting said current-to-pneumatic conversion means to said variable impedance circuit.

2. The positioner of claim 1, wherein said impedance control means comprises means for maintaining voltage between said input terminals at a definitive value by controlling impedance of said variable impedance circuit so that current, obtained by subtracting current required for driving said current-to-pneumatic conversion means from current signal values inputted to said input terminals, flows in said variable impedance circuit.

3. The positioner of claim 1, wherein said impedance control means comprises a timing circuit for suppressing increase of voltage between said input terminals at time of start up.

4. A valve positioner having a digital computation circuit and a current-to-pneumatic conversion module together with a digital communication circuit; wherein said digital communication circuit receives current signals containing set point information as inputs through input terminals and controls valve openings so that each opening agrees with each corresponding set point value; and wherein said current-to-pneumatic conversion module converts the control signals from the digital computation circuit into pneumatic signals; and wherein said digital communication circuit implements digital communications using a transmission line that sends the current signals; and further comprising:

power voltage generating means that generates an internal power voltage from said current signals;

a variable impedance circuit connected in series with said power voltage generating means and having an impedance which is lower in a DC range and higher in a frequency band for digital communication; and an impedance control circuit that controls the impedance of said variable impedance circuit, wherein said current-to-pneumatic conversion module is connected in parallel to said variable impedance circuit.

5. The positioner of claim 4, wherein said impedance control circuit is configured so that voltage between said input terminals is maintained at a definite value by controlling impedance of said variable impedance circuit so that current, obtained by subtracting current required for driving said current-to-pneumatic conversion module from a current signal value inputted from said input terminals, flows in said variable impedance circuit.

6. The positioner of claim 4, wherein said impedance control circuit is provided with a timing means for suppressing increase of voltage between said input terminals at time of start up.

7. A current-to-pneumatic converter comprising:

digital computation means for receiving current signals containing set-point information as inputs through input terminals and for implementing control computation of pneumatic signals so that each pneumatic signal agrees with each corresponding set point value;

current-to-pneumatic conversion means for converting control output signals from said digital computation means into pneumatic signals;

power voltage generating means for generating an internal power voltage from current signals;

a variable impedance circuit connected in series with said power voltage generating means and in parallel with said current-to-pneumatic conversion means; and impedance control means for controlling impedance of said variable impedance circuit.

8. The converter of claim 7, wherein said impedance control means comprises means for maintaining voltage between said input terminals at a definite value by controlling impedance of said variable impedance circuit so that current, obtained by subtracting current required for driving said current-to-pneumatic conversion means from a current signal value inputted from said input terminals, flows in said variable impedance circuit.

9. The converter of claim 7, wherein said impedance control means comprises means for suppressing increase of voltage between said input terminals at time of start up.

10. A current-to-pneumatic converter having a digital computation circuit and a current-to-pneumatic conversion module together with a digital communication circuit; wherein said digital computation circuit receives current signals containing set point information as inputs through input terminals and controls computation of pneumatic signals so that each pneumatic signal agrees with each corresponding set point value; and wherein said current-to-pneumatic conversion module converts control signals from said digital computation circuit into pneumatic signals; and wherein said digital communication circuit implements digital communications using a transmission line that sends said current signals; said current-to-pneumatic converter further comprising:

power voltage generating means that generates an internal power voltage from said current signals;

a variable impedance circuit connected in series with said power voltage generating means and having an impedance which is lower in a DC region and higher in a frequency band for digital communications;

an impedance control circuit that controls impedance of said variable impedance circuit; and means for connecting in parallel said current-to-pneumatic conversion module to said variable impedance circuit.

11. The converter of claim 10, wherein said impedance control circuit is configured so that voltage between said input terminals is maintained at a definite value by controlling impedance of said variable impedance circuit so that current, obtained by subtracting current required for driving said current-to-pneumatic conversion module from current signal value inputted from said input terminals, flows in said variable impedance circuit.

12. The converter of claim 10, wherein said impedance control circuit comprises means for suppressing increase of voltage between said input terminals at time of start up.

* * * * *